United States Patent Office 3,504,081
Patented Mar. 31, 1970

3,504,081
LUBRICANTS
Erwin Aron, Clifton, N.J., assignor to Technical Processing, Inc., Paterson, N.J., a corporation of New Jersey
No Drawing. Filed Sept. 13, 1967, Ser. No. 667,350
Int. Cl. B28b 7/36, 7/38
U.S. Cl. 264—338
16 Claims

ABSTRACT OF THE DISCLOSURE

Lubricants which are particularly useful as parting agents in the molding of rubber articles comprise a mixture of from 3 to 25 parts by weight of a dialkyl phthalate, and/or a dibenzoate of dipropylene glycol or tripropylene glycol; 15 to 35 weight percent of a mono-alkylphenyl ether of a lower polyethylene glycol; and from about 40 to about 80 weight percent of higher polyethylene glycols and/or their alkylphenyl mono-ethers.

DESCRIPTION OF THE INVENTION

The present invention is concerned with novel lubricating substances. In particular the present invention is related to lubricating compositions having especial utility as mold release agents and cleaners.

Many materials, such as soaps, silicones, glycols and the like, have been and are being used to facilitate the release of rubber goods from molds. Some of them, particularly the silicones, are very effective as release agents; but frequently there are serious drawbacks in their application. One of the drawbacks which is often encountered is mold build-up, which quickly leads to imperfections in the molded articles and necessitates frequent cleaning of molds. In other cases the surfaces of the molded goods require an extra cleaning step before further processing or use, or the surfaces may show cracking and overlaps. These latter undesirable effects are most frequently associated with silicone lubricants, which otherwise are preferred because of their excellent releasing qualities. Other difficulties caused by commonly used mold release agents are imperfections of articles due to non-fill of molds and imbedding of accumulated residues of release agents.

With the novel mold lubricants of this invention the aforementioned difficulties can be avoided, mold cleaning is much less frequently needed, surfaces of molded articles are not greasy, are attractive, show details clearly, and allow further processing, such as painting and laminating, etc., without extra cleaning. Also, these novel mold lubricants are compatible with all commonly used water-dispersible mold release agents and, if used in conjunction with them, improve such release agents. In certain cases therefore, when extreme releasing properties are necessary, it is possible to combine these novel mold lubricants with silicone emulsions without experiencing the usual drawbacks of the silicones.

The lubricant compounds of the present invention comprise uniform mixtures of compounds selected from three classes. The first class (I) comprises dialkyl phthalates, the alkyl groups of which may be the same or different and can be straight chain or branched with from about 4 to about 13 carbons in the chain. Illustrative alkyl groups include butyl, hexyl, octyl, decyl and tri-decyl. In addition to, or in place of, the phthalates there can be employed a dibenzoate of dipropylene glycol or tripropylene glycol.

The second class (II) of compounds comprises the monoalkylphenyl ethers of lower molecular weight polyethylene glycols wherein the alkyl group may be a straight or branched chain group of from about 8 to about 12 carbons and the polyethylene glycol contains from about 4 to about 6 ethyleneoxy units of the partial formula:

(—CH$_2$CH$_2$O—)

Illustrative examples include the nonylphenyl and dodecylphenyl ethers of tetraethylene glycol and hexaethylene glycol.

The remaining class (III) comprises higher molecular weight polyethylene glycols, i.e., polyethylene glycols containing from about 7 to about 35 ethyleneoxy units, as well as their alkylphenyl mono-ethers wherein the alkyl group is straight or branched chain of from about 8 to about 12 carbons. Illustrative of this class are the polyethylene glycols having molecular weights in the range of from about 400 to about 1500, and preferably in the range of from about 400 to about 600, and the nonylphenyl, octylphenyl and dodecylphenyl mono-ethers thereof.

The compounds which are employed in forming the compositions of this invention are known commercially-available materials. The polyglycols are usually marketed as mixtures, and reference to molecular weight or number of ethyleneoxy units has reference to the average composition of such products. Similarly, the alkylphenyl ethers are marketed as mixtures of the various isomers, with the para-isomer predominating.

The compositions of this invention contain at least one member from each of the foregoing groups in proportions such that the composition facilitates release of a molded article from the mold without adverse effect on the surface of the molded product. Thus, one or more compounds of Class I are employed in an amount sufficient to provide a good surface for the molded product and to aid in the maintenance of clean mold surfaces; one or more compounds of Class III are employed in amounts sufficient to ensure good release of the molded product from the mold; and one or more compounds of Class II are employed in amounts sufficient to provide a uniform mixture of the selected compounds of Classes I and III as well as to assist the cleaning action of the compounds of Class I. In general it has been found that the foregoing properties are achieved when compounds of Class I are employed in amounts varying from about 3 to about 25 weight percent, the compounds of Class II are employed in amounts varying from about 15 to about 35 weight percent, and compounds of Class III are present in an amount varying from about 40 to about 80 weight percent. With reference to the compounds of Class III, it has been found that at least about 24 weight percent of the total composition should comprise a mono alkylphenyl ether of a polyethylene glycol having from about 7 to about 15 ethyleneoxy units and that not more than about 2 weight percent of the composition should comprise a polyethylene glycol or a mono-ether thereof having from about 15 to about 35 ethyleneoxy units.

The compositions of this invention are readily prepared by mixing the selected compounds in a convenient fashion, as by stirring. In some cases, to achieve a uniform mixture, it may be necessary to heat the mixture to melt components which are solid at room temperature.

The compositions of this invention, while generally useful as lubricants for a variety of purposes, are particularly useful as mold release agents and mold cleaners, particularly for molding rubber articles. When employed as release agents the compound may be applied to the mold face as such or preferably after dilution with an inert, volatile liquid carrier, e.g., dissolved or dispersed in a liquid organic or aqueous medium. Water is preferred as the carrier. The concentration of the compound of this invention in such diluted form is not narrowly critical and can vary widely depending on the intended use. In general, however, the concentration will vary from about 0.1 percent to about 30 percent. When used as a mold lubricant, the concentration is preferably in the range of from about 0.5 to about 2.0 percent. At higher concentrations, for example, from about 15 to about 25 percent, the resulting composition is better suited for use as a mold cleaner.

The compositions of this invention, whether employed as a release agent or a cleaner, may be applied to the mold face in any convenient fashion, such as brushing, spraying or the like.

Although the compositions of this invention are generally superior to other commercially available lubricants there may be other lubricants which may be superior for specific limited applications. For example, as noted previously, silicone emulsions are characterized by extremely high releasing properties, but frequently cause imperfections in the surface of the article. In such instances it has been found that when a composition of this invention is applied in admixture with other lubricants the undesirable properties of the other lubricants are substantially reduced or eliminated without impairment, or with improvement, of the desirable properties.

The following examples are illustrative of the use of the compositions of this invention as mold lubricants and cleaners under commercially employed conditions for molding rubber goods employing silicones, polyglycols, soaps, non-ionic detergents and other commercially available products. The polyethylene glycols and their alkylphenyl ethers were commercially-available products having an average composition as identified in the examples. The alkylphenyl ethers were isomeric mixtures, primarily para, with the balance mainly ortho. All parts and percentages are by weight.

EXAMPLE 1

A rubber article made from natural rubber was molded and press cured at 307° F. The mold was sprayed with a 1.3% dispersion of a mixture of 25 parts di(2-ethylhexyl)phthalate, 35 parts of the nonylphenyl ether of tetraethylene glycol and 40 parts of the nonylphenyl ether of tridecaethylene glycol in water. After 500 heats the mold was still sufficiently clean for further molding. With the same article under the same conditions the experience with soaps, polyglycols, polyglycolethers, silicones, and the like, had been that after from 100 to 300 molding cycles the molds had to be cleaned. Imperfections of this molded article with commonly used release agents were high, the reject rate being as much as 10%. With the use of the composition of this invention this reject rate was reduced to 2%, and the surface appearance of the goods was better.

EXAMPLE 2

A rubber article made from Neoprene W was molded and press cured at 400° F. The mold was sprayed with a 2.0% dispersion of the composition employed in Example 1 in water. After 1000 heats the mold was still clean. With other commonly used external lubricants only 200 to 300 moldings could be made before mold cleaning was necessary.

EXAMPLE 3

A mold which needed cleaning because of sticking residues which had accumulated on its surfaces was brushed with a 20% dispersion of the composition employed in Example 1 in water. Then a rubber article made from Neoprene W was molded and press cured in it at 400° F. After five heats using this dispersion the mold was in excellently clean condition.

EXAMPLE 4

A mold fouled badly with reverted Natsyn 400, a condition which heretofore could only be overcome by a long and tedious job of burning the reverted material off, was sprayed with a 20% dispersion of the composition employed in Example 1 in water. Then the same Natsyn formulation was molded at 375° F. The process was repeated five times. The mold was then sufficiently clean for use.

EXAMPLE 5

The same rubber article as in Example 1 was molded and press cured at 307° F. The mold was sprayed with a 1.0% dispersion of a mixture of 5 parts of di(2-ethylhexyl)phthalate, 25 parts of the nonylphenyl ether of tetraethylene glycol, 25 parts of the nonylphenyl ether of tridecaethylene glycol and 45 parts of a polyethylene glycol having a molecular weight of about 400 in water. After 500 heats the mold was still sufficiently clean for further molding.

EXAMPLE 6

Strips of a passenger tire sidewall compound made from styrenebutadiene rubber and whole tire reclaim were molded and press cured at 307° F. for 20 minutes. The molds were sprayed with a 0.5% dispersion of the composition described in Example 5 in water. The strips, after a short cooling period, were painted, without prior cleaning, with an acrylic latex paint. They accepted the paint evenly, and after drying the paint was found to be adhering well.

EXAMPLE 7

Strips of passenger tire sidewall compound as in Example 6 were molded and press cured at 307° F. for 20 minutes. The molds were sprayed with a 0.5% dispersion in water containing 0.25% of the composition described in Example 5 and 0.25% of a commercial 30% silicone emulsion mold lubricant. The strips, after a short cooling period, were painted with an acrylic latex paint. The paint was accepted by the surface and, after drying, was adhering well. When the silicone lubricant is employed alone the paint will not adhere without prior cleaning of the rubber surface.

EXAMPLE 8

The same rubber article as in Example 2 was molded and press cured at 400° F. The mold was sprayed with a 1.3% dispersion of 15 parts of di(2-ethylhexyl)phthalate, 30 parts of the nonylphenyl ether of tetraethylene glycol, 35 parts of a nonylphenyl ether of tridecaethylene glycol, and 20 parts of a polyethylene glycol having a molecular weight of about 400 in water. After 1000 heats the mold was still usable without cleaning.

EXAMPLE 9

A rubber article made from butyl rubber was molded and press cured at 400° F. The mold was sprayed with a 1.3% dispersion of the composition employed in Example 8 in water. After 1000 heats the mold was still clean. This number of moldings was more than double that achieved with other lubricants.

EXAMPLE 10

Employing the same conditions as in Example 4, except that a 20% dispersion of the composition employed in Example 8 in water was employed as the cleaner, results comparable to Example 4 were obtained.

EXAMPLE 11

A rubber article made from styrene-butadiene rubber was molded and press cured at 425° F. The mold was sprayed with a 1.0% dispersion of a mixture of 3 parts of di(2-ethylhexyl)phthalate, 5 parts of the nonylphenyl ether of tetraethylene glycol, 15 parts of the dodecylphenyl ether of hexaethylene glycol, 29 parts of the nonylphenyl ether of tridecaethylene glycol, 47 parts of polyethylene glycol having a molecular weight of about 400 and 1 part of a polyethylene glycol having a molecular weight of about 1500 in water. After 1000 heats the mold was still clean. With the use of other lubricants only about 300 moldings were possible without cleaning. Residues in the mold, encountered with commonly used lubricants, were eliminated.

EXAMPLE 12

The same rubber article as in Example 11 was molded and press cured at 425° F. The mold was sprayed with a 1.0% dispersion of a mixture of 5 parts di-tridecyl phthalate, 35 parts of the nonylphenyl ether of tetraethylene glycol, 35 parts of the nonylphenyl ether of tridecaethylene glycol and 25 parts of a polyethylene glycol having a molecular weight of about 400 in water. After 1000 moldings the mold was still clean.

EXAMPLE 13

The same rubber article as in Example 9 was molded and press cured at 400° F. The mold was sprayed with a 1.0% dispersion of 5 parts tripropylene glycol dibenzoate, 25 parts of the octylphenyl ether of nonaethylene glycol, 25 parts of the nonylphenyl ether of tetraethylene glycol and 45 parts of a polyethylene glycol having a molecular weight of about 300 in water. After 1000 heats the mold was still clean.

EXAMPLE 14

A rubber article made from nitrile rubber was molded and press cured at 425° F. The mold was sprayed with a 1.0% dispersion of a mixture of 5 parts dipropylene glycol dibenzoate, 5 parts dibutyl phthalate, 20 parts of the nonylphenyl ether of tetraethylene glycol, 25 parts of the octylphenyl ether of tridecaethylene glycol, 42 parts of a polyethylene glycol having a molecular weight of about 400 and 3 parts of a polyethylene glycol having a molecular weight of about 600 in water. After 100 heats the mold was still usable without cleaning. With other external lubricants only about 100 moldings of this article could be made until mold cleaning became necessary.

EXAMPLE 15

The same rubber article as in Example 9 was molded and press cured at 425° F. The mold was sprayed with a 1.0% dispersion of a mixture of 10 parts butyl octyl phthalate, 30 parts of the nonylphenyl ether of tetraethylene glycol, 20 parts of the nonylphenyl ether of decaethylene glycol, 10 parts of the dodecylphenyl ether of nonaethylene glycol and 30 parts of a polyethylene glycol having a molecular weight of about 400 in water. After 1000 moldings the mold was still clean.

What is claimed is:

1. A composition comprising a uniform admixture of:
  (a) from about 3 to about 25 parts by weight of at least one of a dialkyl phthalate, the alkyl groups of which contain from about 4 to about 13 carbon atoms, or a dibenzoate of dipropylene glycol or tripropylene glycol;
  (b) from about 15 to about 35 parts by weight of at least one of an alkylphenyl mono-ether of a lower molecular weight polyethylene glycol, said ether having an alkyl group of from about 8 to about 12 carbons and from about 4 to about 6 ethyleneoxy units; and
  (c) from about 40 to about 80 parts by weight of at least one of a higher molecular weight polyethylene glycol containing from about 7 to about 35 ethyleneoxy units and alkylphenyl mono-ethers thereof wherein the alkyl group contains from about 8 to 12 carbons, there being at least about 24 parts by weight of a mono-ether having from about 7 to about 15 ethyleneoxy units and no more than 2 parts of a polyethylene glycol or mono-ether thereof having more than about 15 ethyleneoxy units.

2. A composition according to claim 1 wherein component (a) is at least one dialkyl phthalate, the alkyl groups of which are selected from the group consisting of butyl, octyl and tridecyl.

3. A composition according to claim 1 wherein component (a) is at least one of said dibenzoates.

4. A composition according to claim 1 wherein component (b) is at least one of a nonylphenyl or dodecylphenyl mono-ether of tetra or hexaethylene glycol.

5. A composition according to claim 1 wherein component (c) is at least one of a polyethylene glycol having from 9 to 13 ethyleneoxy units and the alkylphenyl mono-ethers thereof.

6. A composition according to claim 1 in admixture with an inert, volatile liquid carrier.

7. A mixture accordance to claim 6 wherein said carrier is water.

8. A mixture according to claim 7 wherein the concentration of said composition in said mixture is in the range of from about 0.1 to about 30 weight percent.

9. A mixture according to claim 8 wherein said concentration is in the range of from about 0.5 to about 2.0 weight percent.

10. A mixture according to claim 8 wherein said concentration is in the range of from about 15 to about 25 weight percent.

11. A mold lubricant composition useful for cleaning mold surfaces and as a release agent comprising a uniform admixture of:
  (a) at least one of a dialkyl phthalate, the alkyl groups of which contain from about 4 to about 13 carbon atoms, or a dibenzoate of dipropylene glycol or tripropylene glycol;
  (b) at least one of an alkylphenyl mono-ether of a lower molecular weight polyethylene glycol, said ether having an alkyl group of from about 8 to about 12 carbons and from about 4 to about 6 ethyleneoxy units; and
  (c) at least one of a higher molecular weight polyethylene glycol containing from about 7 to about 35 ethyleneoxy units and alkylphenyl mono-ethers thereof wherein the alkyl group contains from about 8 to 12 carbons;

said components present in proportions such that component (a) is present in an amount sufficient to clean said mold surfaces, component (c) is present in an amount sufficient to aid in the release of the molded article from said mold surfaces and component (b) is present in an amount sufficient to aid in forming a uniform admixture.

12. In a method for molding a rubber article comprising subjecting a rubber material to heat and pressure in a mold, the improvement of, prior to charging said material to said mold, applying to the surface of said mold a composition comprising a uniform admixture of:
  (a) from about 3 to about 25 parts by weight of at least one of a dialkyl phthalate, the alkyl groups of which contain from about 4 to about 13 carbon atoms, or a dibenzoate of dipropylene glycol or tripropylene glycol;
  (b) from about 15 to about 35 parts by weight of at least one of an alkylphenyl mono-ether of a lower molecular weight polyethylene glycol, said ether having an alkyl group of from about 8 to about 12 carbons and from about 4 to about 6 ethyleneoxy units; and
  (c) from about 40 to about 80 parts by weight of at least one of a higher molecular weight polyethylene glycol containing from about 7 to about 35 ethyleneoxy units and alkylphenyl mono-ethers thereof wherein the alkyl group contains from about 8 to 12 carbons, there being at least about 24 parts by weight of a mono-ether having from about 7 to about 15 ethyleneoxy units and no more than 2 parts by weight of a polyethylene glycol or mono-ether thereof having more than about 15 ethyleneoxy units.

13. A method according to claim 12 wherein said composition is in admixture with an inert, volatile, liquid carrier.

14. A method according to claim 13 wherein said carrier is water.

15. A method according to claim 14 wherein the concentration of said composition in said mixture is from about 0.5 to about 2.0 weight percent.

16. A method according to claim 14 wherein the concentration of said composition in said mixture is from about 15 to about 25 weight percent.

References Cited

UNITED STATES PATENTS

| | | | |
|---|---|---|---|
| 2,347,983 | 5/1944 | Backoff et al. | 252—170 |
| 2,965,589 | 12/1960 | Price | 106—38.24 XR |
| 3,069,361 | 12/1962 | Cogswell | 252—89 XR |
| 3,253,932 | 5/1966 | White et al. | 106—38.22 |

JULIUS FROME, Primary Examiner

L. B. HAYES, Assistant Examiner

U.S. Cl. X.R.

106—38.22, 38.24; 117—5.3; 252—57, 170